United States Patent
Koga

(10) Patent No.: US 9,575,430 B2
(45) Date of Patent: Feb. 21, 2017

(54) MULTI-BEAM OPTICAL SCANNING APPARATUS AND IMAGE FORMING APPARATUS

(71) Applicant: CANON KABUSHIKI KAISHA, Tokyo (JP)

(72) Inventor: Katsuhide Koga, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/712,644

(22) Filed: May 14, 2015

(65) Prior Publication Data

US 2015/0338769 A1    Nov. 26, 2015

(30) Foreign Application Priority Data

May 22, 2014   (JP) ................................. 2014-105952

(51) Int. Cl.
| | |
|---|---|
| *B41J 2/385* | (2006.01) |
| *G03G 15/04* | (2006.01) |
| *B41J 2/47* | (2006.01) |
| *G02B 26/10* | (2006.01) |
| *G03G 21/14* | (2006.01) |
| *H04N 1/113* | (2006.01) |
| *H04N 1/053* | (2006.01) |

(52) U.S. Cl.
CPC .......... *G03G 15/04072* (2013.01); *B41J 2/47* (2013.01); *G02B 26/10* (2013.01); *G03G 21/14* (2013.01); *H04N 1/053* (2013.01); *H04N 1/113* (2013.01); *H04N 2201/04755* (2013.01)

(58) Field of Classification Search
CPC .................................................. G03G 15/043
USPC ......................... 347/229, 234, 235, 248–250
See application file for complete search history.

(56) References Cited

U.S. PATENT DOCUMENTS

| | | | |
|---|---|---|---|
| 5,075,785 A * | 12/1991 | Sugishima | ........... H04N 1/3873 358/296 |
| 6,266,078 B1 | 7/2001 | Koga et al. | .................... 347/236 |
| 6,396,858 B2 | 5/2002 | Kawakami et al. | ....... 372/38.02 |
| 6,919,979 B2 | 7/2005 | Seki et al. | .................... 359/204 |
| 7,268,797 B2 | 9/2007 | Hata et al. | .................... 347/237 |
| 7,746,370 B2 | 6/2010 | Hata et al. | .................... 347/237 |

(Continued)

FOREIGN PATENT DOCUMENTS

| | | | |
|---|---|---|---|
| JP | WO 2013161259 A1 * | 10/2013 | .......... G03G 15/043 |
| WO | 2013/161259 | 10/2013 | |

*Primary Examiner* — Stephen Meier
*Assistant Examiner* — John P Zimmermann
(74) *Attorney, Agent, or Firm* — Fitzpatrick Cella Harper & Scinto

(57) ABSTRACT

The optical scanning apparatus correctly measures a gap between the laser beams of a plurality of the laser beams even when the scanning speed is changed and when the variation is caused, rightly corrects the variation. Thus, the optical scanning apparatus inputs detection signal BD_IN to the edge detecting unit at timing at which the laser beam is detected. During the enable gating, the count value representing the distance between the head laser beam and the end laser beam is counted in the counting unit. A plurality of speed ratio parameters according to the degree of changes in the scanning speed is input in the selector. The selector selects any one of the speed ratio parameters and multiplies by the count value by the multiplier, it is controlled to obtain the same multiplication result whichever scanning speed may be selected.

3 Claims, 12 Drawing Sheets

(56) References Cited

U.S. PATENT DOCUMENTS

| | | | |
|---|---|---|---|
| 8,120,633 B2 | 2/2012 | Koga | 347/236 |
| 8,957,932 B2 | 2/2015 | Koga | 347/237 |
| 2007/0242128 A1* | 10/2007 | Sobue | H04N 1/053 347/253 |
| 2009/0190943 A1* | 7/2009 | Yamashita | G03G 15/043 399/51 |
| 2011/0129244 A1* | 6/2011 | Shoji | G03G 15/011 399/51 |
| 2013/0147891 A1 | 6/2013 | Koga | 347/118 |

* cited by examiner

MULTI-BEAM OPTICAL SCANNING APPARATUS AND IMAGE FORMING APPARATUS

BACKGROUND OF THE INVENTION

Field of the Invention

The present disclosure relates to an optical scanning apparatus capable of emitting one or more laser beams and an image forming apparatus mounting the optical scanning apparatus.

Description of the Related Art

Image forming apparatus has realized high processing speed and enhanced image resolution. Along with this, the optical scanning apparatus is advanced to multi-beam scanning, in which two or more plurality laser beams are used. Also, electrophotography printer, capable of forming variety of screens used in the printing market into high quality image, is desired. However, in multi-beam scanning, when position gap in a main scanning direction is caused on an image on a photosensitive drum formed by each beam, the position gap is periodically caused in a sub-scanning direction. Due to this, moire is caused or image is distorted. To solve such problems, an image forming apparatus disclosed in WO2013/161259(A1) measures the phase difference between a plurality of laser light beams which determines a writing start position in the main scanning direction and adjusts light emitting timing of each laser beam based on the measured result.

Further, due to an increase in temperature in the apparatus due to heat generated during operation, reflective index of lens may vary in the optical scanning apparatus. In this case, the phase difference between the laser beams varies. The image forming apparatus disclosed in WO2013/161259 (A1) detects the variation amount of the phase difference between the laser beams using a beam detect (BD) sensor and corrects the variation in the phase difference caused by the increase in temperature according to the detection result. That is, the image forming apparatus measures the phase difference between a head laser beam and an end laser beam of a plurality of the laser beams received by the BD sensor, compares the measured data with data measured at the time of shipping from a factory, and detects the variation amount of the phase difference. According to the variation amount detected, the image forming apparatus corrects a writing start position (light emitting start timing) of each laser beam.

An example of the image forming apparatus is briefly explained as follows. FIG. 12 is a schematic diagram of the laser beams detected by the BD sensor. Following explains the contents of (1) to (5) in FIG. 12.

(1) Three laser beams L1 to L3 remain off and approach a BD sensor 209.

(2) L1 lighting signal turns to HIGH. Only the laser beam L1 lights.

(3) The laser beam L1 irradiates the BD sensor 209 and a BD signal turns to HIGH. When the BD signal turns to HIGH, the laser beam L1 turns off (L1 lighting signal=Low). The BD signal also turns to Low. At the same time, the laser beam L3 lights (L3 lighting signal=High).

(4) The laser beam L3 which lit enters the BD sensor 209. Then, the BD signal turns to HIGH.

(5) The laser beam L3 stops irradiating the BD sensor 209. Then, the BD signal turns to Low.

Time from a first rising edge (irradiation of laser beam L1) of the BD signal (measured at the time of shipping from a factory) to a second rising edge (irradiation of laser beam L3) represents a phase difference Ta between the laser beam L1 and the laser beam L3. The phase difference Ta is represented by a count value. The count value is a value represents time counted from the irradiation of the laser beam L1 to the irradiation of the laser beam L3 using a reference clock signal. That is, the phase difference Ta is a gap between the laser beam L1 and the laser beam L3. However, the phase difference Ta, measured at the time of shipping from a factory, varies to a phase difference Tb of the BD signal (measured when temperature increased) due to the increase in temperature. Thus, the phase difference Ta is previously stored, and the difference between the stored phase difference Ta and the phase difference Tb at the time of the increase in temperature is detected. In the above example, an average value of the variation amount of the three laser beams is calculated by the following expression: Variation amount $\Delta=(Tb-Ta)/2$. Then, the light emitting timing is so adjusted that the phase difference is corrected by the average value. Thereby the writing start position of each laser beam can be aligned.

In an application (AP) which uses the electrophotographic image forming apparatus, to deal with various types of sheets (plain sheet, fine sheet), several processing speeds are often prepared for image formation. If the processing speed is changed by the AP, scanning speed of the optical scanning apparatus on the image forming apparatus side accordingly changes. The variation of the phase difference between the laser beams (which represents the gap between the laser beams) is caused due to the increase in temperature. The variation is also caused when the scanning speed is changed. On the other hand, in the conventional image forming apparatus of this kind, changing the scanning speed is not taken into account. That is, it is not possible to flexibly cope with the change of the scanning speed, which is a problem. Thus, the optical scanning apparatus which can correctly measure the gap between the laser beams even when the scanning speed is changed and when the variation is caused, rightly corrects the variation.

SUMMARY OF THE INVENTION

The optical scanning apparatus according to an embodiment of the present disclosure comprises a light source having a plurality of light emitting elements, each of which emits laser beams, arranged such that the light emitting elements expose respective different positions in a scanning direction; a scanning mechanism configured to scan the laser beam emitted from each of the light emitting elements in the scanning direction; a sensor configured to output, by receiving the laser beams emitted from at least two light emitting elements, detection signals respectively corresponding to the at least two laser beams according to timing at which the at least two laser beams are respectively received; a measuring unit configured to obtain speed information representing scanning speed of the plurality of the laser beams and a gap between the detection signals corresponding to the at least two laser beams output from the sensor and measure a gap between particular laser beams in the scanning direction based on the gap between the detection signals and the speed information obtained; and a control unit configured to compare the gap measured and the gap in a reference state which is previously stored and control light emitting timing of the plurality of the light emitting elements according to a comparison result.

Further features of the present invention will become apparent from the following description of exemplary embodiments (with reference to the attached drawings).

DESCRIPTION OF THE EMBODIMENTS

First Embodiment

Figure 1:
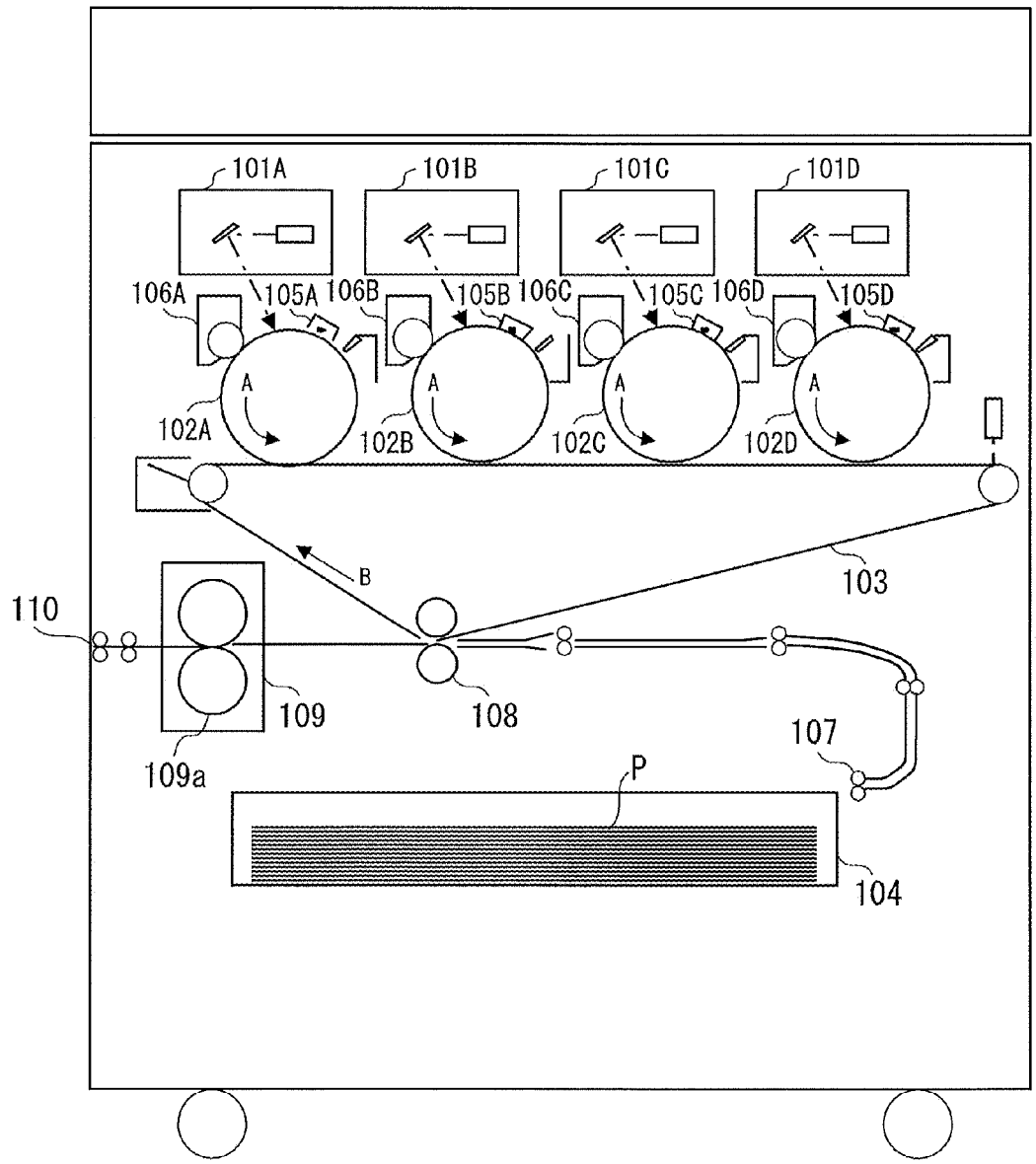
FIG. 1 is a schematic vertical cross-sectional view of an image forming apparatus according to a first embodiment.

FIG. 1 is a schematic cross-sectional view of an image forming apparatus according to the first embodiment of the present invention. The image forming apparatus comprises image forming units respectively forming images of different color. The image forming unit comprises a plurality of components. For example, the image forming apparatus comprises photosensitive drum 102 (102A, 102B, 102C, 102D) which rotates in an arrow A direction. A primary charger 105 (105A, 105B, 105C, 105D) uniformly charges the surface of the photosensitive drum 102.

An optical scanning apparatus 101 (101A, 101B, 101C, 101D) is provided near the photosensitive drum 102. The optical scanning unit 101 is, for example, a laser scanner, which forms the laser light modulated based on image data input from an external device into the beam and irradiates the laser beam light on the surface of the photosensitive drum 102. Through the above, an electrostatic latent image is formed on the photosensitive drum 102. A developing unit 106 (106A, 106B, 106C, 106D) develops the electrostatic latent images using the toner having each color to form toner image. The toner image is primarily transferred to an intermediate transfer unit 103 which rotates in a B direction in the drawing. On the other hand, a transfer member P in a sheet feeding unit 104 is fed one by one by a pick up roller 107 and conveyed to a secondary transfer unit 108. The secondary transfer unit 108 secondarily transfers the toner image having transferred to the intermediate transfer unit 103 to the transfer member P. Using a fixing device 109 including a fixing roller 109a having a heat source such as halogen heater inside, the toner image secondarily transferred to the transfer member P is fixed and the transfer member P is delivered from a sheet delivery unit 110.

[Laser Light Scanning Apparatus]

Figure 2:
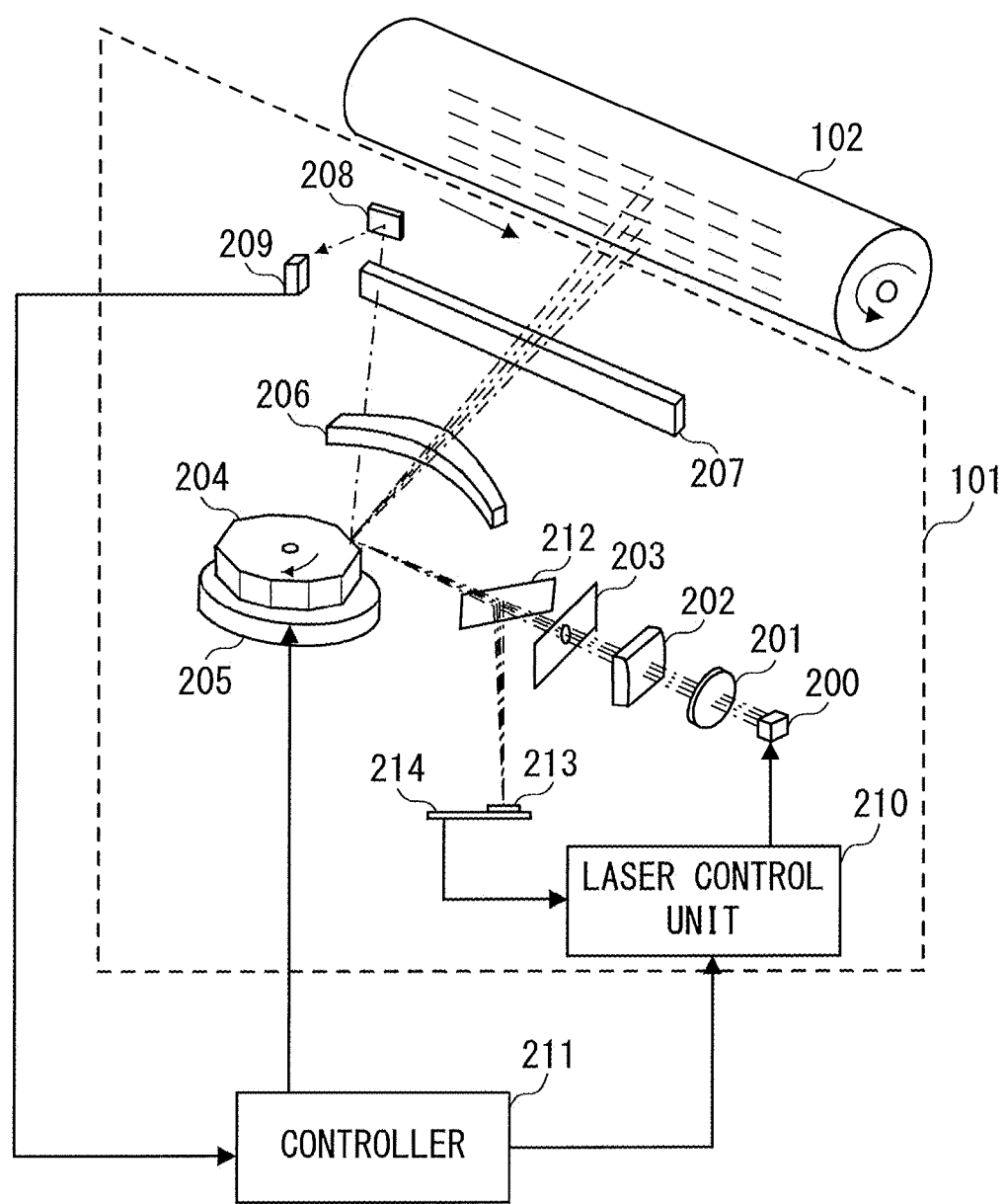
FIG. 2 is a structural diagram of an optical scanning apparatus.

FIG. 2 is an entire structural diagram of the optical scanning apparatus 101. The optical scanning apparatus 101 comprises a laser control unit 210 for performing light emitting control of a light source 200 and a controller 211 which controls the entire operation of the optical scanning apparatus 101 including the laser control unit 210. The light source 200 has a plurality of light emitting elements which are arranged at different positions in a main scanning direction and which emits laser light in order. The laser control unit 210 controls light emitting amount and light emitting timing of the light emitting elements.

The laser light emitted from the light source 200 under the light emitting control of the laser control unit 210 is scanned in a predetermined direction by a scanning mechanism. That is, the laser lights emitted from a plurality of the light emitting elements pass through a collimator lens 201 to form respective parallel rays. The parallel rays are condensed in a sub-scanning direction by a cylindrical lens 202. The sub-scanning direction is a direction which is orthogonal to a direction in which the laser light scans a polygon mirror 204. The condensed parallel rays are converged in a main scanning direction by an aperture diaphragm 203. The main scanning direction is a direction in which the laser light scans the polygon mirror 204.

The laser light passes the aperture diaphragm 203 to form a beam. A part of the beams enters a photodiode sensor (PD) 213 by a half mirror 212. The rest of the beams are irradiated to the polygon mirror 204. The PD sensor 213 outputs current according to the incident light amount. The PD unit 214 converts the current output from the PD sensor into voltage. The converted voltage is input to the laser control unit 210. The laser control unit 210 monitors the voltage and controls such that the light amount of the laser beams emitted from the light source 200 have a constant value.

The polygon mirror 204, referred to as a rotating polygon mirror, rotates at a constant speed by a polygon motor 205. The rotating speed is controlled by the controller 211. The laser light beam irradiated to the polygon mirror 204 are deflected according to the rotation of the polygon mirror 204, pass through a fθ lens 206 and a reflecting mirror 207, and scan a surface of a photosensitive drum 102. Using the fθ lens 206, the deflected laser beams are scanned at a constant speed on the photosensitive drum 102 and the beam spot is condensed in the main scanning direction.

The laser beams deflected by the polygon mirror 204 are also reflected by a reflection mirror 208 and enter a BD sensor 209. By receiving the laser beams being scanned, the BD sensor 209 outputs a detection signal at detection timing according to the arrangement of light emitting elements. The BD sensor 209 also works as a synchronization sensor. That is, at the detection timing at which the laser beams used to detect synchronization and write image are received (detected), the BD sensor 209 outputs the BD signal, which is the detection signal, to the controller 211. Based on the BD signal, the controller 211 controls the rotation speed of the polygon motor 205 such that one rotation period of the polygon mirror 204 is always constant. That is, the BD signal can be used to synchronize the rotation speed of the polygon mirror 204 with the writing start timing of the image. The controller 211 works to adjust the rotation speed by the BD signal. In addition, the controller 211 works to adjust the light emitting timing of each laser beam. Thereby, the writing start timing of each laser beam in the main scanning position is adjusted.

Figure 3A:
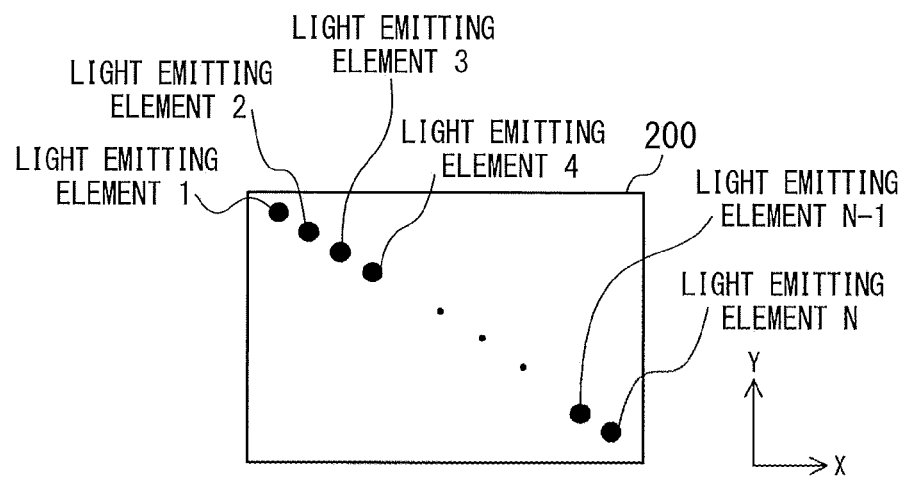
FIGS. 3A and 3B are diagrams for explaining the relation in the arrangement of light source, BD sensor and multi-laser.

Next, description is given with regard to the relation between the light source 200 and the BD sensor 209. FIG. 3A is an enlarged diagram of the light source 200. The light source 200 has N light emitting elements (light emitting elements 1 to N), each of which emits the laser beam. The laser beam L1 is emitted from the light emitting element 1. The laser beam L2 is emitted from the light emitting element 2. The laser beam Ln is emitted from the light emitting element N. X-axis direction in FIG. 3A corresponds to the main scanning direction in which the laser beams deflected by the polygon mirror 204 scan the photosensitive drum 102. Further, Y-axis direction corresponds to the rotation direction of the photosensitive drum (sub-scanning direction).

The light emitting elements 1 to N are arranged in an array having a predetermined angle to the X-axis direction. Thus, the laser beams L1 to Ln, emitted from each of the light emitting elements 1 to N, form images at different positions on the photosensitive drum 102 in the main scanning direction. Similarly, the laser beams L1 to Ln, emitted from each of the light emitting elements 1 to N, form images at different positions in the sub-scanning direction. In the present embodiment, light emission is controlled such that the image is formed on the photosensitive drum 102 by the laser beam L1 first, followed by the laser beam Ln. Thus, the laser beam L1 first enters the BD sensor 209. Then, the laser beam Ln follows. It is noted that the arrangement of the light emitting elements 1 to N is not limited to the example shown in FIG. 3A. For example, the light emitting elements are arranged in two-dimensional array.

Figure 3B:
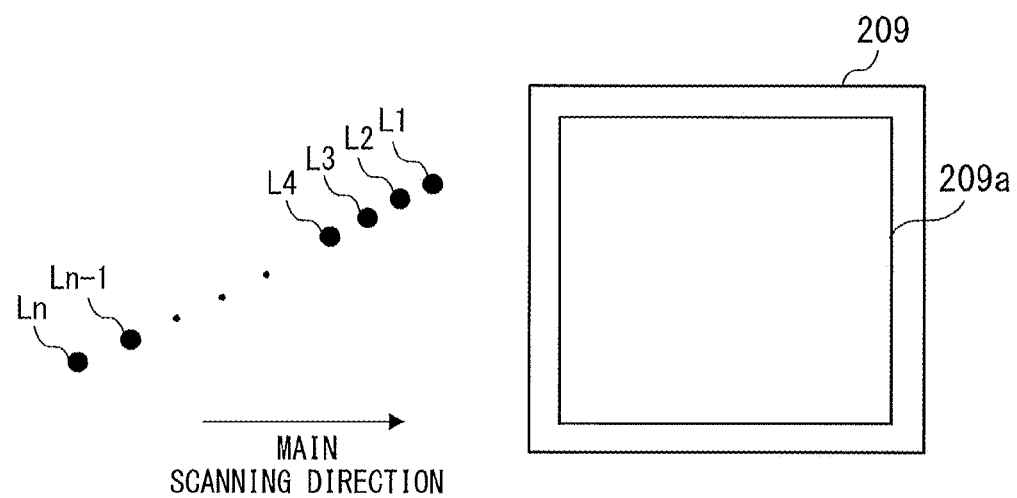

FIG. 3B is a schematic diagram of the BD sensor 209. The BD sensor 209 includes a light receiving surface 209a on which photoelectric conversion elements are arranged. When the laser beams L1 to Ln enter the light receiving surface 209a, the BD signal as mentioned is generated. It is noted that a width of the light receiving surface 209a in the main scanning direction is set to a size which the laser beam L1 and the laser beam Ln do not enter at the same time.

Figure 4:
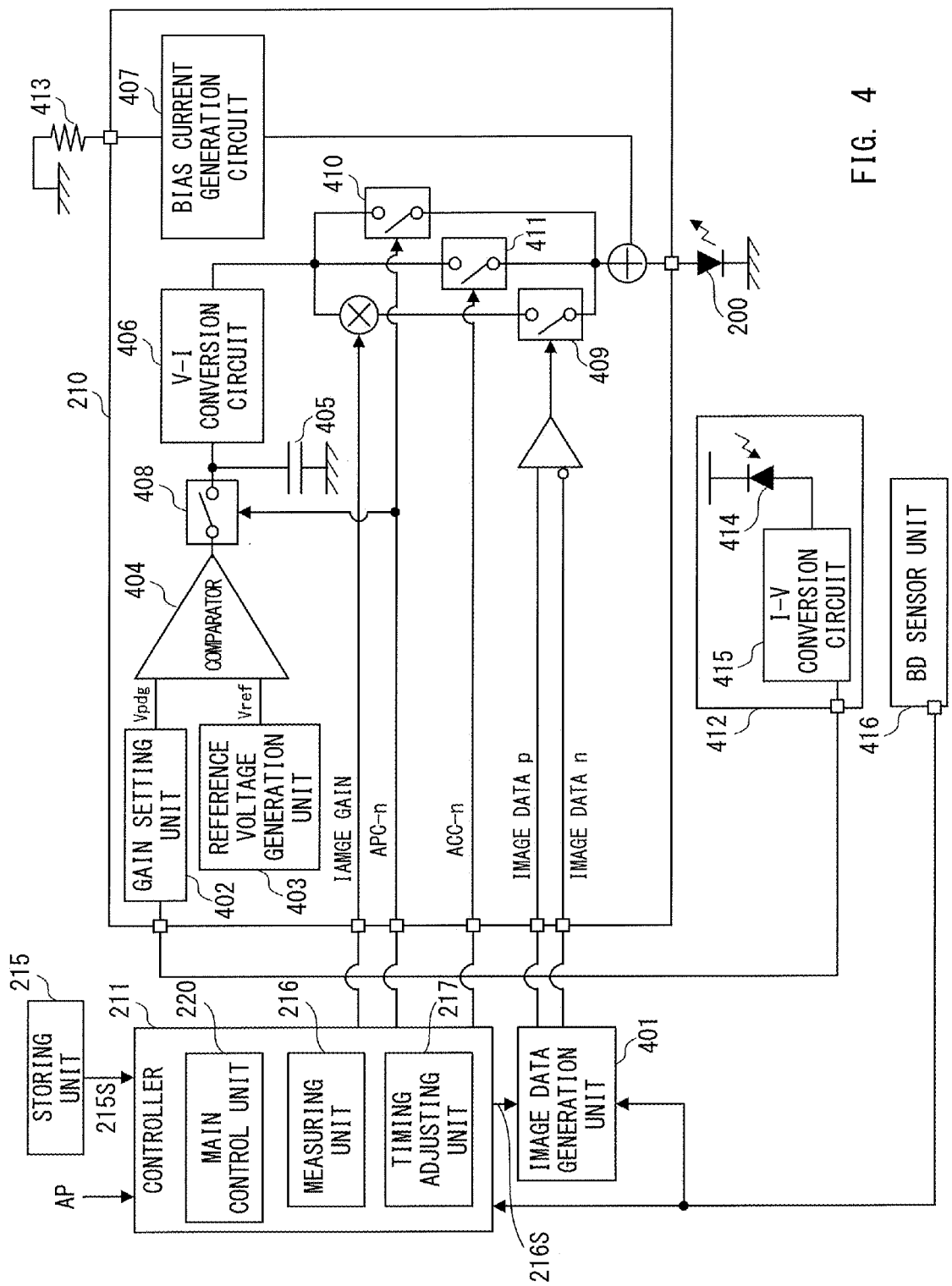
FIG. 4 is a structural diagram of a control system of the optical scanning apparatus.

Then, description is given with regard to the control system of the optical scanning apparatus 101. FIG. 4 is a block configuration diagram of the control system. The controller 211 includes a measuring unit 216, a timing adjusting unit 217, and a main control unit 220. The measuring unit 216 obtains speed information representing the scanning speed of the laser beams L1 to Ln and the detection signal output from the BD sensor 209. Based on the detection signal and the speed information obtained, the measuring unit 216 measures a gap between particular laser beams in the main scanning direction. Similar to the conventional technology, the distance between the laser beams can be measured based on, for example, the phase difference represented by the detection signal. The gap between the particular laser beams may be the gap between the laser beam L1 and the laser beam Ln. Alternatively, the gap may be the gap obtained by dividing the distance between the laser beams L1 and Ln by the number of the laser beams. In this embodiment, description is given with regard to the latter example. The speed information is the information representing an image forming job or degree of changes in the scanning speed to a reference scanning speed. The information is input by an application (AP) of an external device. The reference scanning speed means the scanning speed which is set, for example, at the time of shipping from a factory.

The timing adjusting unit 217 adjusts timing of various signals used in the light scanning apparatus 101. The light emitting timing of the light emitting element is one of the timing. The timing adjusting unit 217 outputs a timing signal 216S, which is transmitted to an image data generation unit 401, and an image gain signal, which is transmitted to the laser control unit 210, and an APC-n signal and an ACC-n signal. The APC-n signal is output at timing at which an auto power control (APC) of the laser beam Ln is performed. The ACC-n signal is output at timing at which the laser beam Ln is forcibly emitted at a current value determined by an auto current control (ACC) regardless of the image data. The image gain signal is a signal for switching gain of the light amount which forms image according to the scanning speed.

The main control unit 220 controls operation of the controller 211 including the measuring unit 216 and the timing adjusting unit 217 as mentioned. Further, cooperating with the measuring unit 216 and the timing adjusting unit 217, the main control unit 220 corrects the gap between the laser beams and controls the light emitting timing of the light emitting elements.

A storing unit 215, the image data generation unit 401 and a BD sensor unit 416 are connected to the controller 211. Further, the speed information described above is input from the external device. In the storing unit 215, phase difference data representing the gap between the laser beams in a reference state is stored. The reference state is a state of an operation environment of the light scanning apparatus 101 which is measured at the time of shipping from a factory. The phase difference data is data obtained by dividing the distance between the head laser beam L1 and the end laser beam Ln by "the number of the light emitting elements −1".

The BD sensor unit 416 includes the BD sensor 209 as mentioned and outputs the synchronization signal to the controller 211 and the image data generation unit 401 at timing at which the laser beam enters the BD sensor 209, i.e., at a detection timing. The controller 211 reads phase difference data 215S as mentioned from the storing unit 215. Then, based on the phase difference data 215S, in synchronization the BD signal, the controller 211 outputs the timing signal 216S, which sequentially delays the image data from the laser beam L1 to the laser beam Ln, to the image data generation unit 401. The image data generation unit 401 transmits image data in accordance with the image forming job (differential signal) p, n to the laser control unit 210 according to the timing signal 216S output from the timing adjusting unit 217.

The laser control unit 210 comprises a gain setting unit 402, a reference voltage generation unit 403, a comparator 404, an APC sampling hold condenser 405, a V-I (voltage-current) conversion circuit 406, a bias current generation circuit 407, a SW 408, a SW 409, a SW 410, and a SW 411. In the gain setting unit 402, a gain value is set. The gain value is a value previously adjusted to cause the light source 200 to emit a predetermined light amount of the laser beams L1 to Ln. When output voltage Vpd in a PD amplifier circuit 412 is input, the gain setting unit 402 multiplies the output voltage Vpd by the set gain value and outputs the voltage as amplified voltage Vpdg. It is noted that the gain value is a value adjusted at the time of shipping from a factory. The detail thereof is omitted in the present embodiment.

The comparator 404 compares the amplified voltage Vpdg with a reference voltage Vref generated in the reference voltage generation unit 403. Then, if the amplified voltage Vpdg is less than the reference voltage Vref, the comparator 404 outputs the current. If the amplified voltage Vpdg exceeds the reference voltage Vref, the comparator 404 draws the current. If the value of the amplified voltage Vpdg is the same as that of the reference voltage Vref, the comparator 404 neither output nor draw the current.

The SW 408 is turned ON when the APC-n signal is input from the controller 211. When the APC-n signal is not input, it is turned OFF. When the SW 404 is ON and the current is output from the comparator 404, the APC sampling hold condenser 405 charges electric charge. When the current is drawn to the comparator 404, the APC sampling hold condenser 405 discharges the electric charge. Due to the above, the APC sampling hold condenser 405 charges a predetermined electric charge in the condenser to generate predetermined voltage. Further, when the SW 408 is OFF, the APC sampling hold condenser 405 holds the electric charge being charged.

The V-I conversion circuit 406 outputs current Iop according to the voltage generated in the APC sampling hold condenser 405. When the APC-n signal is input from the controller 211, the SW 410 is turned ON. Then, at timing at which the APC is performed, the V-I conversion circuit 406 supplies the current Iop to the light source 200 to emit the light source 200. In this state, it is controlled such that predetermined light amount is emitted from the light source 200. In the following, a mode in which the light source 200 emits light under such control is called "APC light emitting mode".

When an instruction to change the scanning speed is given from the AP, the controller 211 transmits the image gain signal, which is to switch gain of the light amount which forms image according to the degree of changes in the scanning speed, to the laser control unit 210. By turning ON/OFF of the SW 409 based on the light amount determined by the APC control and the image gain signal and the image data generated in the image data generation unit 401, the SW 409 drives lighting ON/lighting OFF of each of the light emitting elements L1 to Ln of the light source 200.

When the ACC-n signal is input from the controller 211, the SW 411 is turned ON. At this time, the SW 408 is OFF. The voltage determined by the previous APC is held in the APC sampling hold condenser 405. When the SW 411 is turned ON, the driving current Iop based on the voltage charged in the APC sampling hold condenser 405 is forcibly supplied regardless of the image data to emit the light source 200. In the following, a mode in which the light source 200 emits light under such control is called "ACC light emitting mode".

The bias current generation circuit 407 generates the current based on resistance value of bias current determination resistance 413 connected outside. The bias current generation circuit 407 then supplies the generated current to the light source 200 as the bias current. The PD amplifier circuit 412 comprises a PD 414 and a current-voltage (I-V) conversion circuit 415. When the laser beam Ln is entered from the light source 200, the PD 412 outputs the current according to the light amount. The current-voltage (I-V) conversion circuit 415 converts the current into detection voltage Vpd and outputs the detection voltage Vpd to the laser control unit 210.

Figure 5A:
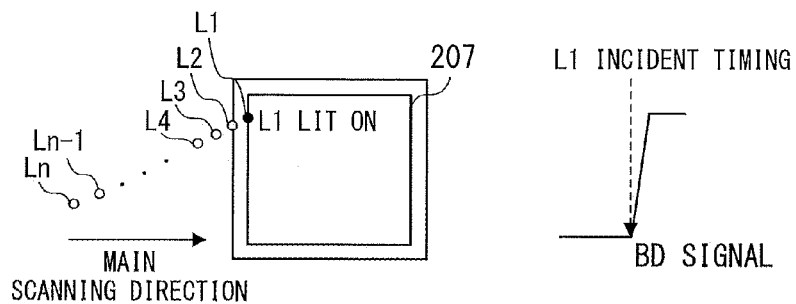
FIGS. 5A, 5B, and 5C are diagrams schematically illustrating detection state of the BD sensor.
Figure 5B:
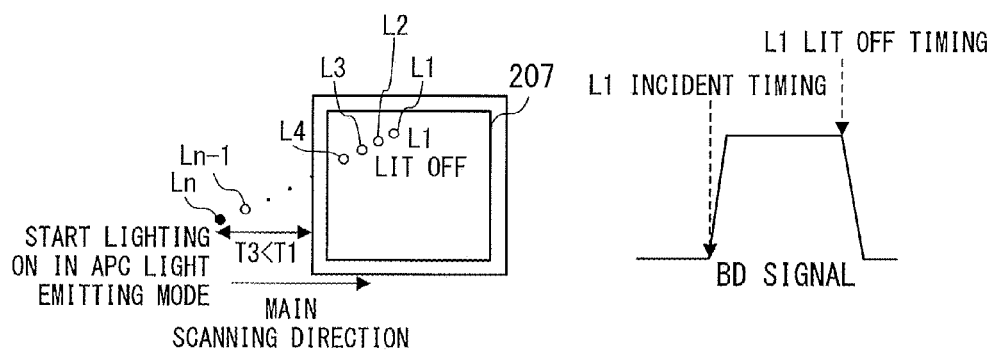
Figure 5C:
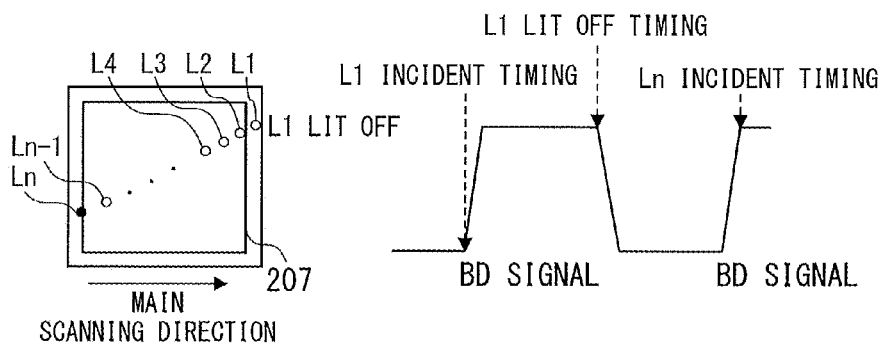

FIG. 5A, 5B, 5C are a diagram schematically illustrating the detection state of the BD sensor 209. Here, in the controller 211 (measuring unit 216), the difference in detection timing between the laser beams emitted from a pair of the light emitting elements L1 and Ln, having a discontinuous order, is measured. Further, based on the number of the light emitting elements which are between the light emitting elements L1 and Ln, the gap between the laser beams is measured. FIG. 5A indicates timing at which the head laser beam L1 entered the light receiving surface 209*a* of the BD sensor 209. At this timing, the BD sensor 209 outputs the BD signal. At this time, the laser beam L1 already started to emit light in the APC light emitting mode just before the laser beam L1 enters the BD sensor 209. At the timing at which the laser beam L1 enters the BD sensor, the light amount is already stabilized. The rest of the laser beams is all lit off.

Thereafter, to light on the next laser beam, the laser beam L1 is controlled to light off quickly. However, due to delay of the electric signal and the control, in the timing to light off the laser beam L1, the laser beam L1 is scanned to the position shown in FIG. 5B. Thereafter, at a position shown in FIG. 5C, the laser beam Ln is lit on and the laser beam is entered to the light receiving surface 209*a* of the BD sensor 209.

Figure 6:
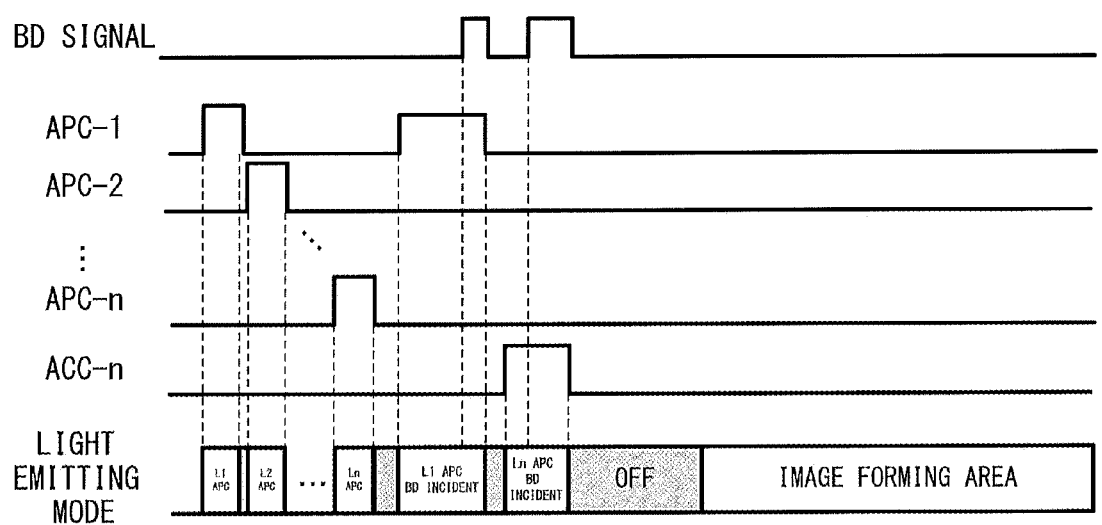
FIG. 6 is a timing chart of a light emitting mode controlled by a controller.

FIG. 6 is a timing chart illustrating the APC-n signal and the ACC-n signal output from the controller 211 and light emitting mode when the signals are output. The APC of each laser beam L1 to Ln is performed in a non-image area. That is, by outputting the APC-1 to APC-n signals from the controller 211 in a time-division manner, the APC is sequentially performed to the laser beams one by one. Then, the controller 211 outputs the APC-1 signal at timing slightly earlier than timing at which each laser beam enters the BD sensor 209 to emit the laser beam L1 in the APC light emitting mode. Thereafter, the laser beam L1 enters the BD sensor 209 (timing shown in FIG. 5A). When the BD signal is output from the BD sensor 209, the controller 211 turns the APC-1 signal to "Low" and lights off the laser beam L1 (timing shown in FIG. 5B). Immediately after that, the controller 211 transmits the ACC-n signal to emit the laser beam Ln in the ACC light emitting mode. Thereby, the BD signal is output from the BD sensor 209 at detection timing at which the BD sensor 209 detected the laser beam Ln (timing shown in FIG. 5C). When the laser beam Ln passes through the light receiving surface 209*a* of the BD sensor 209, the BD signal from the BD sensor 209 is no longer output. Through the above-mentioned processing, the BD signal shown in FIG. 6 is output from the BD sensor 209.

[Measurement of the Distance Between Laser Beams]

Next, description is given with regard to a method to measure the gap between the laser beams when the scanning speed is changed. In the specification, for simplicity, degree of changes is determined to be multiplication of a reciprocal of an integer.

Figure 7:
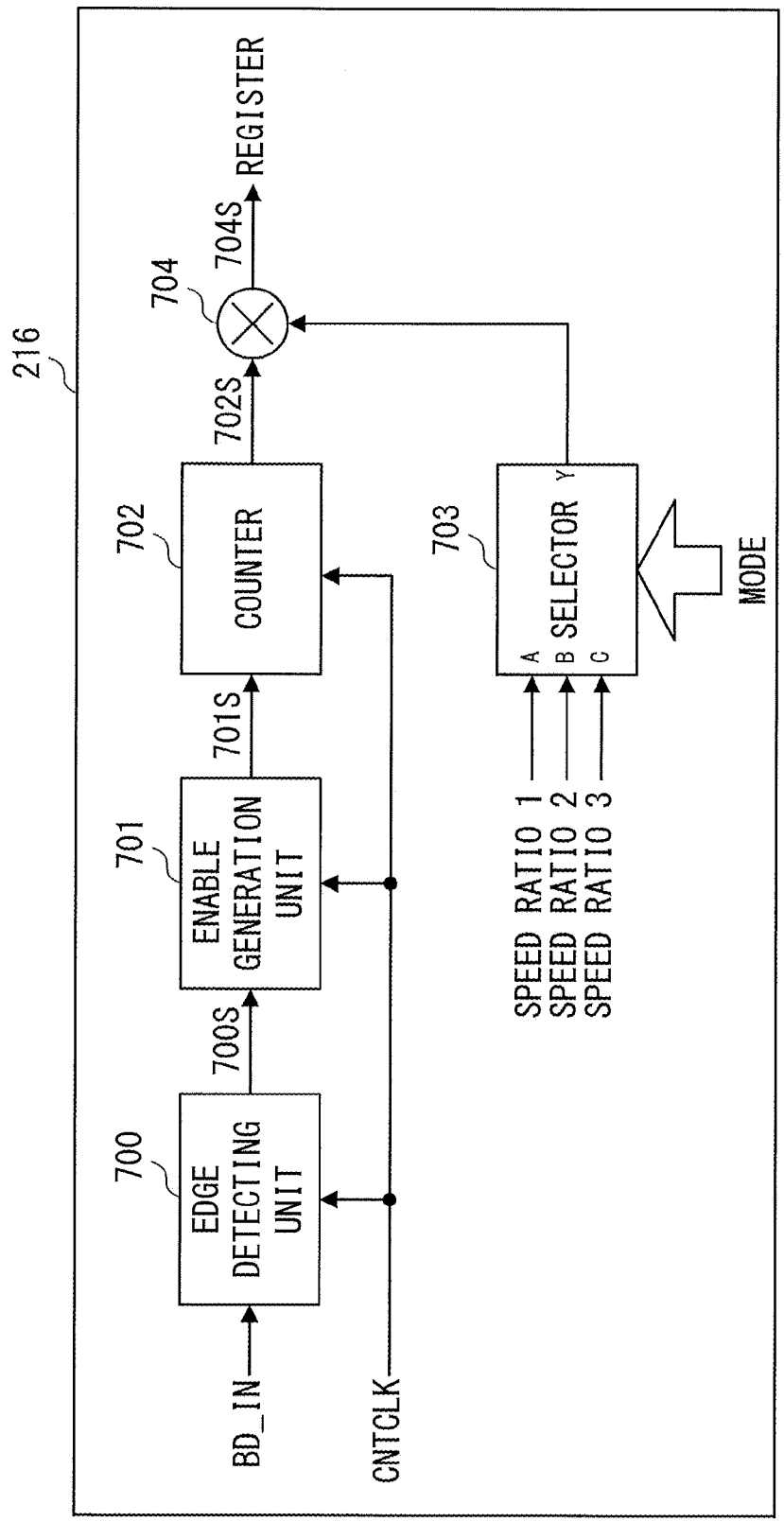
FIG. 7 is a configuration diagram for explaining the detailed function of a measuring unit in the first embodiment.

That is, three scanning speeds, including PS1, PS2, and PS3 are defined. The PS1 is a reference scanning speed. The PS2 is the scanning speed which is half of the reference scanning speed PS1. The PS3 is the scanning speed which is one third of the reference scanning speed PS1. FIG. 7 is a diagram for explaining the function of the measuring unit 216 of the controller 211 in detail. The measuring unit 216 comprises an obtaining unit for chronologically obtaining BD_IN (which is the BD signal input as the detection signal or the synchronization signal, the same applies hereinafter) and CNTCLK (clock signal, the same applies hereinafter). Using the CNTCLK as an operation clock, an edge detecting unit 700 detects the rising edge of the BD_IN. Using the CNTCLK as an operation clock, an enable generation unit 701 generates an enable gate (a gate signal during which High state is maintained) between the two pulses of an edge signal 700S output from the edge detecting unit 700 (enable unit). It is noted that the generation of the enable gate is hereinafter referred to as "enable gating". A counter 702 is a counter (counting unit) which counts the number of the CNTCLKs during the enable gating.

A selector 703 selectively outputs, in advance, a plurality of speed ratio parameters (in this embodiment, three speed ratio parameters) which represent the speed ratio according to the degree of changes in accordance with a predetermined instruction, for example, an instruction from a main control unit 220 to input an operation mode (described later). The speed ratio parameters are stored in a memory or a register (not shown). A multiplier 704 multiplies count value 702S of the CNTCLK counted during the enable gating and the speed ratio parameter output from the selector 703. The result obtained by the multiplier 704 is stored in the register (not shown). The result stored is read by the main control unit 220. Thus, the measuring unit 216 can approximate the count value 702S to count value which corresponds to the reference scanning speed. It is noted that the speed ratio parameter output from the selector 703 can also be used as the image gain signal as mentioned.

To detect the edge of the pulse, the BD sensor 209 needs to receive constant light amount. Thus, even the scanning speed is changed, the light amount, which is the light amount determined by the APC, entering the BD sensor 209 should not be changed. When the speed ratio parameter is half, the light amount irradiated to the image area in unit time is twice as much as compared to that irradiated before the speed ratio parameter is changed (speed ratio parameter before the change="1"). Thus, the light amount in the image area is controlled such that half of the light amount as compared to that irradiated before the change of the speed ratio parameter is irradiated. When the speed ratio parameter is one third, the light amount irradiated to the image area in unit time is three times as much as compared to that irradiated before the speed ratio parameter is changed (speed ratio parameter before the change="1"). Thus, the light amount in the image area is controlled such that one third of the light amount as compared to that irradiated before the change of the speed ratio parameter is irradiated.

Figure 8:
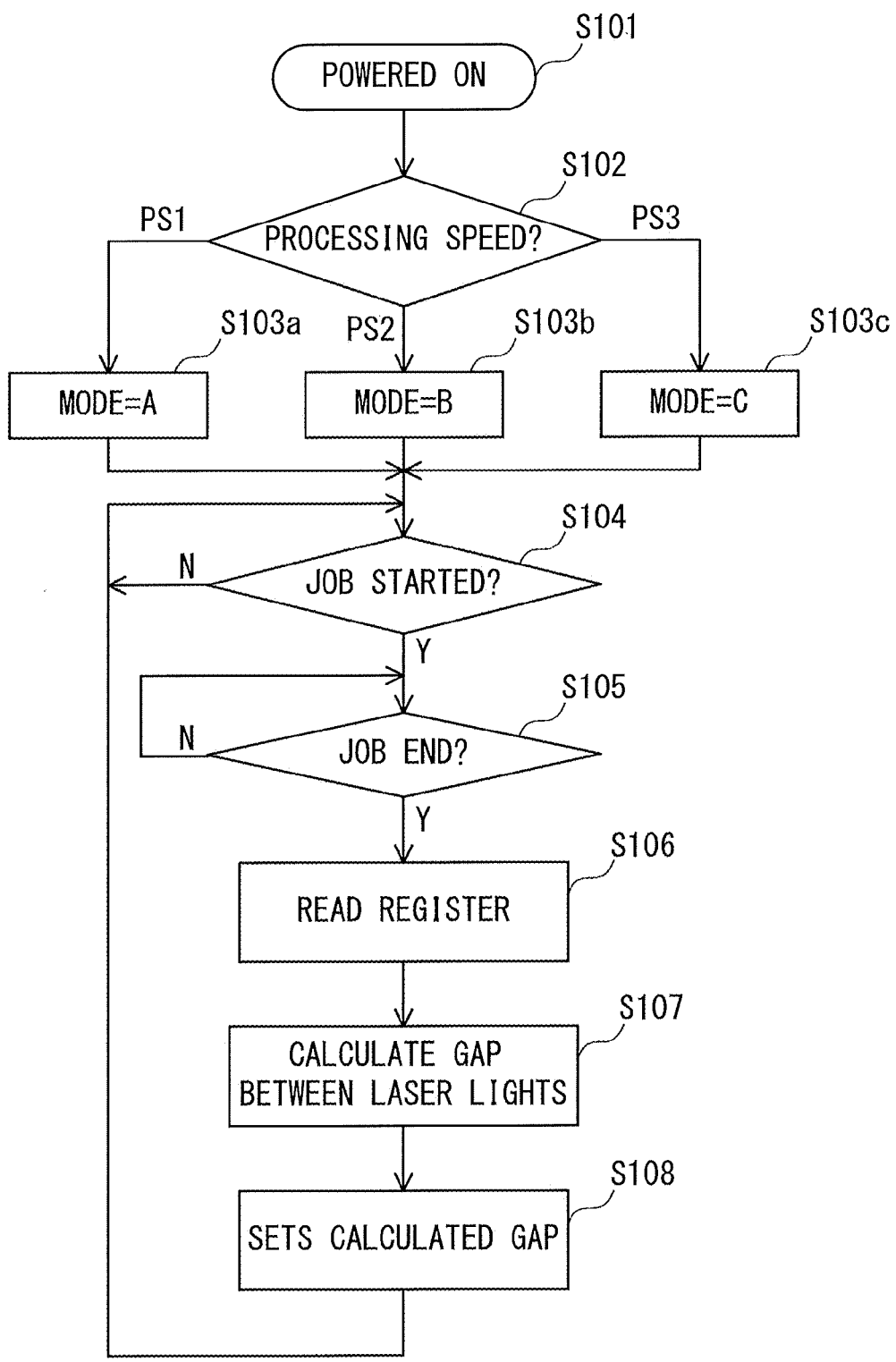
FIG. 8 is a diagram for explaining a sequence in the first embodiment.

Next, description is given, using a sequence diagram in FIG. 8, in a case where the scanning speed is changed. The sequence is executed under a control of the main control unit 220. When the image forming apparatus is powered on (S101) and the optical scanning apparatus 101 (controller 211) becomes operable, based on an image forming job from the AP, the main control unit 220 determines a processing speed depending on a type of sheets and determines a best operation mode (S102). For example, when the scanning speed is the reference scanning speed PS1 as mentioned, the best operation mode is defined as an operation mode A (S103*a*). When the scanning speed is the scanning speed PS2, the best mode is defined as an operation mode B. Similarly, when the scanning speed is the scanning speed PS3, the best mode is defined as an operation mode C. The main control unit 220 instructs any one of the operation modes A, B, or C to the selector 703 of the measuring unit 216.

When the image forming job (JOB) is started (S104: Y), the BD_IN is input to the edge detecting unit 700 of the measuring unit 216. Due to the above, the count value representing the distance of the laser beams L1 to Ln is counted. Further, the count value and the speed ratio parameter output from the selector 703 are multiplied and the multiplication result is stored in the register. The measuring unit 216 continues the procedure until the image forming job ends (S105: N). When the image forming job ends (S105: Y), the main control unit 220 reads the register value stored in the register (S106). The main control unit 220 averages the register value read by the number of input times of the BD_IN to calculate the gap between the laser beams (S107). Thereafter, the main control unit 220 sets the gap calculated in the timing adjusting unit 217 (S108) and waits for the start of the next image forming job (S104). Thereby, in the next image forming job, the image, having the gap as set between the lasers, is formed.

Figure 9A:
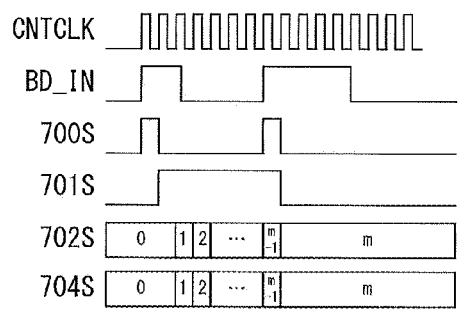
FIGS. 9A, 9B, and 9C are timing charts to measure a gap between the laser beams in the first embodiment.
Figure 9B:
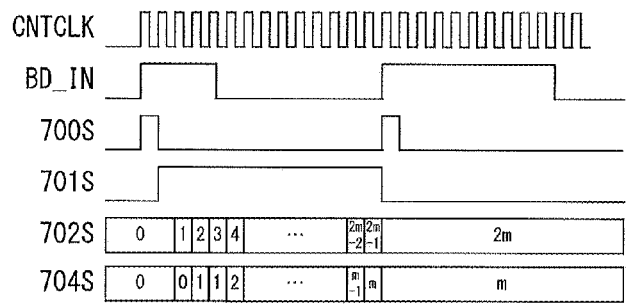
Figure 9C:
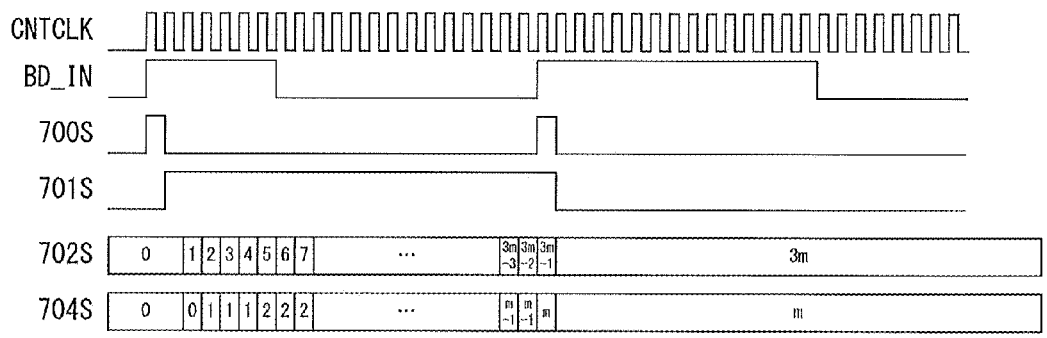

FIG. 9A shows the relation between the CNTCLK, the BD_IN, the edge detecting signal 700S, the enable gate 701S, the count value 702S and the multiplication result 704 when the operation mode A is selected. FIG. 9B shows the relation between the CNTCLK, the BD_IN, the edge detecting signal 700S, the enable gate 701S, the count value 702S and the multiplication result 704S when the operation mode B is selected. Compared to the case where the operation mode A is selected, the distance of the laser beams L1 to Ln is the same. The scanning speed PS2, however, is half of the reference scanning speed PS1. Thus, time taken in both a high section and a low section of the BD_IN in FIG. 9B is twice as long as compared that when the operation mode A is selected. Further, the CNTCLK is the same as compared to that when the operation mode A is selected. Thus, the count value 702S takes twice the value as compared to that when the operation mode A is selected. However, since the speed ratio parameter, selected by the main control unit 220, is half, the multiplication result matches with that when the operation mode A is selected. FIG. 9C shows relation between the CNTCLK, the BD_IN, the edge detecting signal 700S, the enable gate 701S, the count value 702S and the multiplication result 704S when the operation mode C is selected. Compared to the case where the operation mode A is selected, the distance of the laser beams L1 to Ln is the same. The scanning speed PS3, however, is one third of the reference scanning speed PS1. Thus, time taken in both a high section and a low section of the BD_IN in FIG. 9C is three times as long as compared to that when the operation mode A is selected. Further, the CNTCLK is the same as compared to that when the operation mode A is selected. Thus, the count value 702S takes three times the value as compared to that when the operation mode A is selected. However, since the speed ratio parameter, selected by the main control unit 220, is one third, the multiplication result matches with that when the operation mode A is selected.

As mentioned, in the present embodiment, speed ratio parameters are prepared according to the degree of changes in the scanning speed. Then, any one of the speed ratio parameters is selected by the selector 703. Then, the selected speed ratio parameter is multiplied by the counter value. Due to the above, even when there is only one type of the CNTCLK, when the distance of the laser beams L1 to Ln crossing the BD sensor 209 is the same, whichever speed ratio parameter may be selected, the multiplication result matches. Thus, for example, at the time of shipping the image forming apparatus from a factory, by storing the multiplication result when the scanning speed is the reference scanning speed PS1 (speed ratio parameter=1), even when the scanning speed is changed due to the change in the processing speed, the optical scanning apparatus 101 can speedily and easily cope with the change.

Next, description is given with regard to processing to correct the distance between the laser beams when the reflective index of lens is varied by the increase in temperature. When the scanning speed is the reference scanning speed PS1, by the increase in temperature, the distance between the laser beams L1 and L2 is assumed to have extended by $\Delta$ as compared to that measured at the time of manufacturing the apparatus. The time increase in the High section of the enable gate 701S detected at this time is defined as $\Delta t$, the increase of the count value of the CNTCLK is defined as $\Delta cnt$. Even the scanning speed is the scanning speed PS2, the increase in the distance between the laser beams L1 to Ln is $\Delta$. However, the scanning speed PS2 is half of the reference scanning speed PS1, so that the time increase of the enable gate 701S to be detected is $2\Delta t$. Thus, the increase in the count value at this time is twice, which is $2\Delta cnt$. However, when the speed ratio parameter is multiplied, the multiplication result is Δcnt. The relation also applies to the case where the scanning speed is the scanning speed PS3.

As mentioned, regardless of the scanning speed, the distance corresponding to the multiplication result "1" is the same. Thus, even the scanning speed is changed, what is required is to correct the distance between the laser beams by the distance increased in the multiplication result. The distance corresponding to the multiplication result "1" is defined as "a". Then, the correction amount Δp between each of the laser beams can be obtained by the following expression: Δp=Δcnt×a/(n−1). The number of the laser beams between the laser beam L1 and the laser beam Ln is (n−1). This is why "Δcnt×a" is divided by (n−1). By adding the correction amount Δp to a reference gap (reference width between the laser beams) measured at the time of shipping from a factory, the phase shift caused by the increase in temperature is corrected.

Second Embodiment

Next, description is given with regard to the second embodiment of the present invention. What is different from the first embodiment is that by changing the clock period of the clock signal according to the speed information, the count value of the clock signal (CNTCLK) is approximated to count value corresponding to the reference scanning speed. Thus, the obtaining unit of the controller of the optical scanning apparatus is configured to allow obtaining a plurality of clock signals having the clock period according to the degree of changes in the scanning speed.

In this embodiment, for convenience, the obtaining unit 216 is assumed to have obtained CNTCKs including CNTCLK1, CNTCLK2, and CNTCLK3. Each of the CNTCLK1, CNTCLK2, and CNTCLK3 has clock periods respectively corresponding to the reference scanning speed PS1, the scanning speed PS2, and the scanning speed PS3 as explained in the first embodiment. Based on the clock period of the CNTCK1, which is defined as "1", the clock period of the CNTCLK2 is defined as "2", and that of the CNTCLK3 is defined as "3". The same reference numerals are placed to the components having the same function as the first embodiment and to the processing which has the same contents as the first embodiment. The description of the overlapping parts is omitted.

Figure 10:
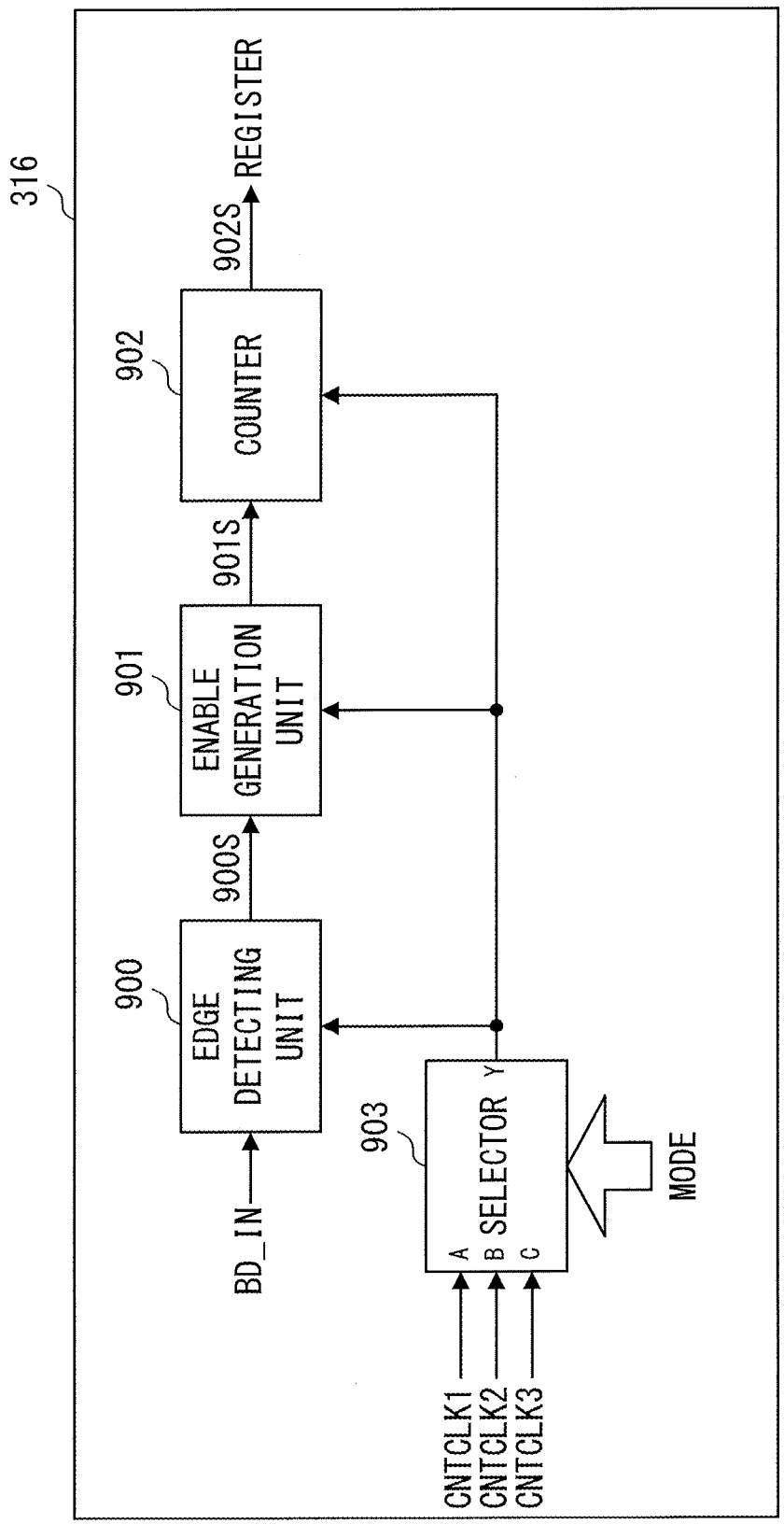
FIG. 10 is a configuration diagram for explaining the detailed function of a measuring unit in a second embodiment.

FIG. 10 is a diagram for explaining the function of measuring unit 316 in detail according to the second embodiment. What is different from the measuring unit as described in the first embodiment is that the measuring unit 316 does not have the multiplier 704. The CNTCLKs respectively selected by a selector 903 is respectively input to an edge detecting unit 900, an enable generation unit 901 and a counter 902, which is also the difference with the measuring unit 216. The selector 903 selectively outputs any one of the CNTCLK1, CNTCLK2, or CNTCLK3 according to the operation modes A, B, and C explained in the first embodiment. The count value counted by the counter 902 is stored in the register.

Figure 11A:
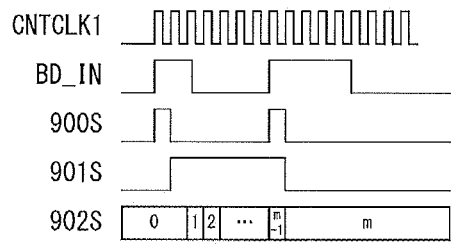
FIGS. 11A, 11B, and 11C are timing charts to measure a gap between the laser beams in the second embodiment.
Figure 11B:
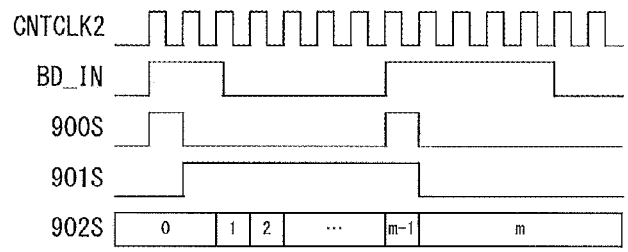
Figure 11C:
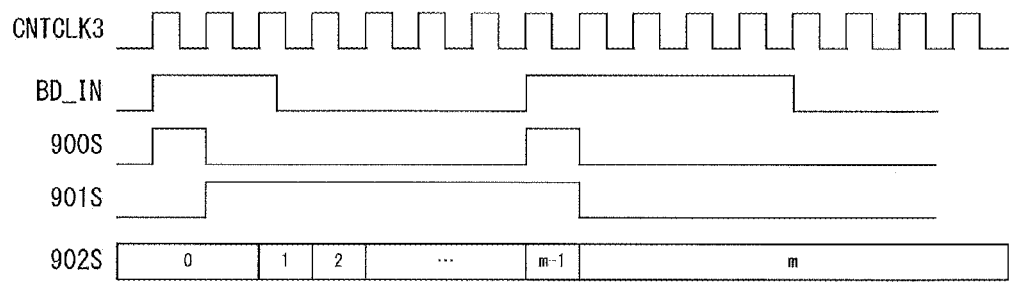
Figure 12:
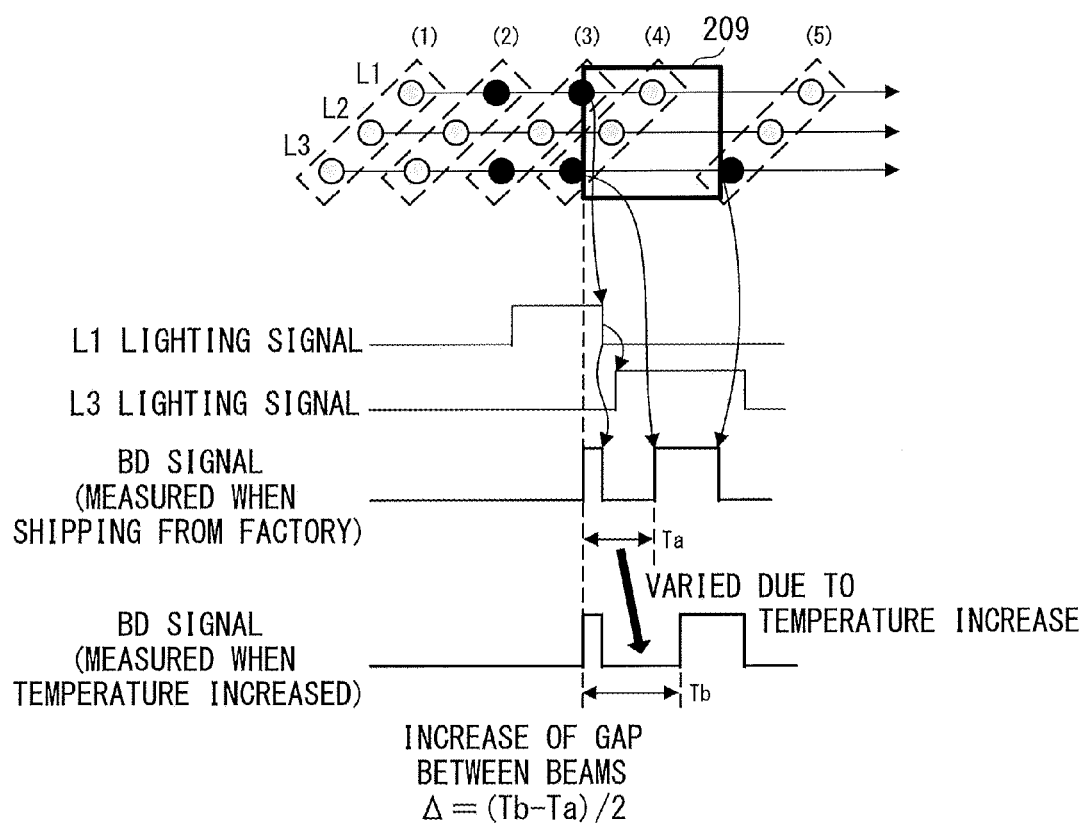
FIG. 12 is a schematic diagram of laser beams detected by the BD sensor.

FIG. 11A shows the relation between the CNTCLK1, the BD_IN, the edge detecting signal 900S, the enable gate 901S, the count value 902S when the operation mode A is selected. FIG. 11B shows the relation between the CNTCLK2, the BD_IN, the edge detecting signal 900S, the enable gate 901S, the count value 902S when the operation mode B is selected. Compared to the case where the operation mode A is selected, the distance of the laser beams L1 to Ln is the same. The scanning speed PS2, however, is half of the reference scanning speed PS1. Thus, in both a high section and a low section of the BD_IN in FIG. 11B, it takes the twice time as compared to the case where the operation mode A is selected. However, the clock period of the CNTCLK2 is twice as compared to that of the CNTCLK1 when the operation mode A is selected, so that the count value 902S takes the same value as compared to that when the operation mode A is selected. FIG. 11C shows relation between the CNTCLK3, the BD_IN, the edge detecting signal 900S, the enable gate 901S, the count value 902S when the operation mode C is selected. Compared to the case where the operation mode A is selected, the distance of the laser beams L1 to Ln is the same. The scanning speed PS3, however, is one third of the reference scanning speed PS1. Thus, time taken in both a high section and a low section of the BD_IN in FIG. 11C is three times as long as compared that when the operation mode A is selected. However, the clock period of the CNTCLK3 is three times as compared to that of the CNTCLK1, so that the count value 902S takes the same value as compared to that when the operation mode A is selected.

As mentioned, in the second embodiment, the measuring unit 316 selectively uses the clock signal having the clock period according to the degree of changes in the scanning speed. Due to the above, when the distance of the laser beams L1 to Ln crossing the BD sensor 209 is the same, whichever operation mode may be selected, the count value matches. Thus, for example, by storing the count value of the reference scanning speed PS1 in the register at the time of shipping the image forming apparatus from a factory, even when the scanning speed is changed due to the change in the processing speed, the optical scanning apparatus 101 can speedily and easily cope with the change.

Next, description is given with regard to the processing to correct the gap between the laser beams in the second embodiment. When the scanning speed is the reference scanning speed PS1, due to the increase in temperature and the like, the distance between the laser beams L1 and Ln is assumed to have extended by A as compared to the count value measured at the time of shipping from a factory. The time increase in the High section of the enable gate 701S detected at this time is defined as Δt, and the increase of the count value when the CNTCLK1 is defined as Δcnt. Even when the scanning speed is the scanning speed PS2, the increase in distance between the laser beams L1 and Ln does not change, which is Δ. The scanning speed is half of the reference scanning speed PS1 so that the increase in time of the High section of the enable gate 701S is 2Δt. However, the period of the CNTCLK2 is twice as that of the CNTCLK1, so that the increase in the count value when the scanning speed is the scanning speed PS2 is Δcnt, which is the same as that when the scanning speed is the reference scanning speed PS1. The same applies when the scanning speed is PS3.

Similar to the first embodiment, regardless of the scanning speed, the distance corresponding to the count value "1" is the same. Thus, even the scanning speed is changed, what is required is to correct the phase between the beams by the distance increased in the count value. The distance corresponding to one count value is defined as "a". Then, the correction amount Δp between each of the beams is obtained by the following expression: Δp=Δcnt×a/(n−1). It is noted that, the distance between the beams to n lasers is (n−1), so that "Δcnt×a" is divided by (n−1), which is similar to the first embodiment. By adding the correction amount Δp to phase difference data between the beams at the time of manufacturing the apparatus, the phase difference caused by the increase in temperature can be corrected.

As mentioned, even the scanning speed is changed, the optical scanning apparatus 101 in the first embodiment and the second embodiment measure the gap between the lasers based on the speed information and can adjust it to the most appropriate gap. Due to this, it is possible to form a good and stabilized image without having moire.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-105952, filed May 22, 2014 which is hereby incorporated by reference wherein in its entirety.

What is claimed is:

1. An image forming apparatus operable to switch a speed of image forming from one image forming speed to another, comprising:

a photosensitive member;

a scanning unit including a light source having a plurality of light emitting elements including a first light emitting element and a second light emitting element, each of which emits laser beams, a polygon mirror configured to deflect the laser beam emitted from each such light emitting element so that the laser beam emitted from each of the light emitting elements scans the photosensitive member, and a sensor configured to output, by receiving the laser beams emitted from the first and second light emitting elements and deflected by the polygon mirror, detection signals respectively corresponding to the first and second light emitting elements, wherein the plurality of light emitting elements are arranged such that the light emitting elements expose respective different positions on the photosensitive member in a scanning direction, and wherein the scanning unit is configured to control the scanning speed of the laser beams to be a speed corresponding to the image forming speed by controlling a rotation speed of the polygon mirror based on scanning speed information;

a storage unit configured to store a reference time interval corresponding to a reference scanning speed of the laser beams;

a measuring unit configured to:

obtain the scanning speed information representing scanning speed of the plurality of the laser beams, measure a time interval between a first timing and a second timing, wherein the first timing is a timing at which the sensor outputs a detection signal by receiving a laser beam irradiated from the first light emitting element during one scanning period of the laser beam, and the second timing is a timing at which the sensor outputs a detection signal by receiving a laser beam irradiated from the second light emitting element, and correct the time interval based on a speed ratio of the reference speed to the scanning speed represented by the scanning speed information; and a control unit configured to compare the corrected time interval with the reference time interval and to control a relative light emitting start timing of the plurality of light emitting elements in one scanning period of the light beams based on a comparison result of the corrected time interval and the reference time interval, wherein the relative light emitting start timing corresponds to the scanning speed represented by the scanning speed information.

2. The image forming apparatus according to claim 1, wherein the scanning direction is a main scanning direction in which image forming is repeated by irradiating the laser beams.

3. The image forming apparatus according to claim 1, wherein the measuring unit further comprises an obtaining unit for obtaining a clock signal, an enable unit configured to use the obtained clock signal as an operation clock and generate enable gate having a length corresponding to the corrected time interval based on the detection timing represented by the detection signal, and a counting unit configured to count a number of the clock signals corresponding to the length of the enable gate.

* * * * *